United States Patent
Ivanov Bonev et al.

(10) Patent No.: US 11,152,001 B2
(45) Date of Patent: Oct. 19, 2021

(54) VISION-BASED PRESENCE-AWARE VOICE-ENABLED DEVICE

(71) Applicant: Synaptics Incorporated, San Jose, CA (US)

(72) Inventors: Boyan Ivanov Bonev, Santa Clara, CA (US); Pascale El Kallassi, Menlo Park, CA (US); Patrick A. Worfolk, San Jose, CA (US)

(73) Assignee: SYNAPTICS INCORPORATED, San Jose, CA (US)

(*) Notice: Subject to any disclaimer, the term of this patent is extended or adjusted under 35 U.S.C. 154(b) by 124 days.

(21) Appl. No.: 16/722,964

(22) Filed: Dec. 20, 2019

(65) Prior Publication Data

US 2020/0202856 A1 Jun. 25, 2020

Related U.S. Application Data

(60) Provisional application No. 62/782,639, filed on Dec. 20, 2018.

(51) Int. Cl.
| | |
|---|---|
| *G10L 15/22* | (2006.01) |
| *G06K 9/00* | (2006.01) |
| *G10L 15/30* | (2013.01) |
| *G10L 15/08* | (2006.01) |
| *G10L 15/25* | (2013.01) |

(52) U.S. Cl.
CPC .......... *G10L 15/22* (2013.01); *G06K 9/00362* (2013.01); *G10L 15/08* (2013.01); *G10L 15/25* (2013.01); *G10L 15/30* (2013.01); *G10L 2015/088* (2013.01); *G10L 2015/223* (2013.01)

(58) Field of Classification Search
CPC .......... G10L 15/08; G10L 15/22; G10L 15/30; G06F 3/167
USPC .......................................................... 704/251
See application file for complete search history.

(56) References Cited

U.S. PATENT DOCUMENTS

| | | | | |
|---|---|---|---|---|
| 8,805,692 B2* | 8/2014 | Goldstein | ............... | H04W 4/80 |
| | | | | 704/275 |
| 9,916,832 B2* | 3/2018 | Mozer | ..................... | G10L 15/22 |
| 10,430,552 B2* | 10/2019 | Mihai | ..................... | G16H 40/67 |
| 10,663,302 B1* | 5/2020 | Shen | ..................... | G01C 21/206 |
| 10,691,202 B2* | 6/2020 | van Hoff | ............. | G06F 3/04815 |
| 10,714,117 B2* | 7/2020 | Binder | ..................... | G10L 17/24 |
| 10,718,625 B2* | 7/2020 | van Os | ..................... | G06F 3/167 |
| 10,818,283 B2* | 10/2020 | Kokubo | ..................... | G10L 15/06 |

(Continued)

*Primary Examiner* — Susan I McFadden
(74) *Attorney, Agent, or Firm* — Paradice & Li LLP

(57) ABSTRACT

A method and apparatus for voice search. A voice search system for a voice-enabled device captures one or more images of a scene, detects a user in the one or more images, determines whether the position of the user satisfies an attention-based trigger condition for initiating a voice search operation, and selectively transmits a voice query to a network resource based at least in part on the determination. The voice query may include audio recorded from the scene and/or the one or more images captured of the scene. The voice search system may further determine whether the trigger condition is satisfied as a result of a false trigger and disable the voice-enabled device from transmitting the voice query to the network resource based at least in part on the trigger condition being satisfied as the result of a false trigger.

20 Claims, 9 Drawing Sheets

(56) References Cited

U.S. PATENT DOCUMENTS

2019/0384619 A1\* 12/2019 Leong .................... G06F 3/167
2021/0156990 A1\* 5/2021 Madhow ............... G01S 13/867

\* cited by examiner

VISION-BASED PRESENCE-AWARE VOICE-ENABLED DEVICE

CROSS-REFERENCE TO RELATED APPLICATION

This application claims priority and benefit under 35 USC § 119(e) to U.S. Provisional Patent Application No. 62/782,639, filed on Dec. 20, 2018, which is incorporated herein by reference in its entirety.

TECHNICAL FIELD

The present embodiments relate generally to voice enabled devices, and specifically to systems and methods for vision-based presence-awareness in voice-enabled devices.

BACKGROUND OF RELATED ART

Voice-enabled devices provide hands-free operation by listening and responding to a user's voice. For example, a user may query a voice-enabled device for information (e.g., recipe, instructions, directions, and the like), to playback media content (e.g., music, videos, audiobooks, and the like), or to control various devices in the user's home or office environment (e.g., lights, thermostats, garage doors, and other home automation devices). Some voice-enabled devices may communicate with one or more network (e.g., cloud computing) resources to interpret and/or generate a response to the user's query. Further, some voice-enabled devices may first listen for a predefined "trigger word" or "wake word" before generating a query to be sent to the network resource.

SUMMARY

This Summary is provided to introduce in a simplified form a selection of concepts that are further described below in the Detailed Description. This Summary is not intended to identify key features or essential features of the claims subject matter, nor is it intended to limit the scope of the claimed subject matter.

A method and apparatus for voice search is disclosed. One innovative aspect of the subject matter of this disclosure can be implemented in a method of operating a voice-enabled device. In some embodiments, the method may include steps of capturing one or more images of a scene, detecting a user in the one or more images, determining whether the position of the user satisfies an attention-based trigger condition for initiating a voice search operation, and selectively transmitting a voice query to a network resource based at least in part on the determination.

BRIEF DESCRIPTION OF THE DRAWINGS

The present embodiments are illustrated by way of example and are not intended to be limited by the figures of the accompanying drawings.

DETAILED DESCRIPTION

Figure 1:
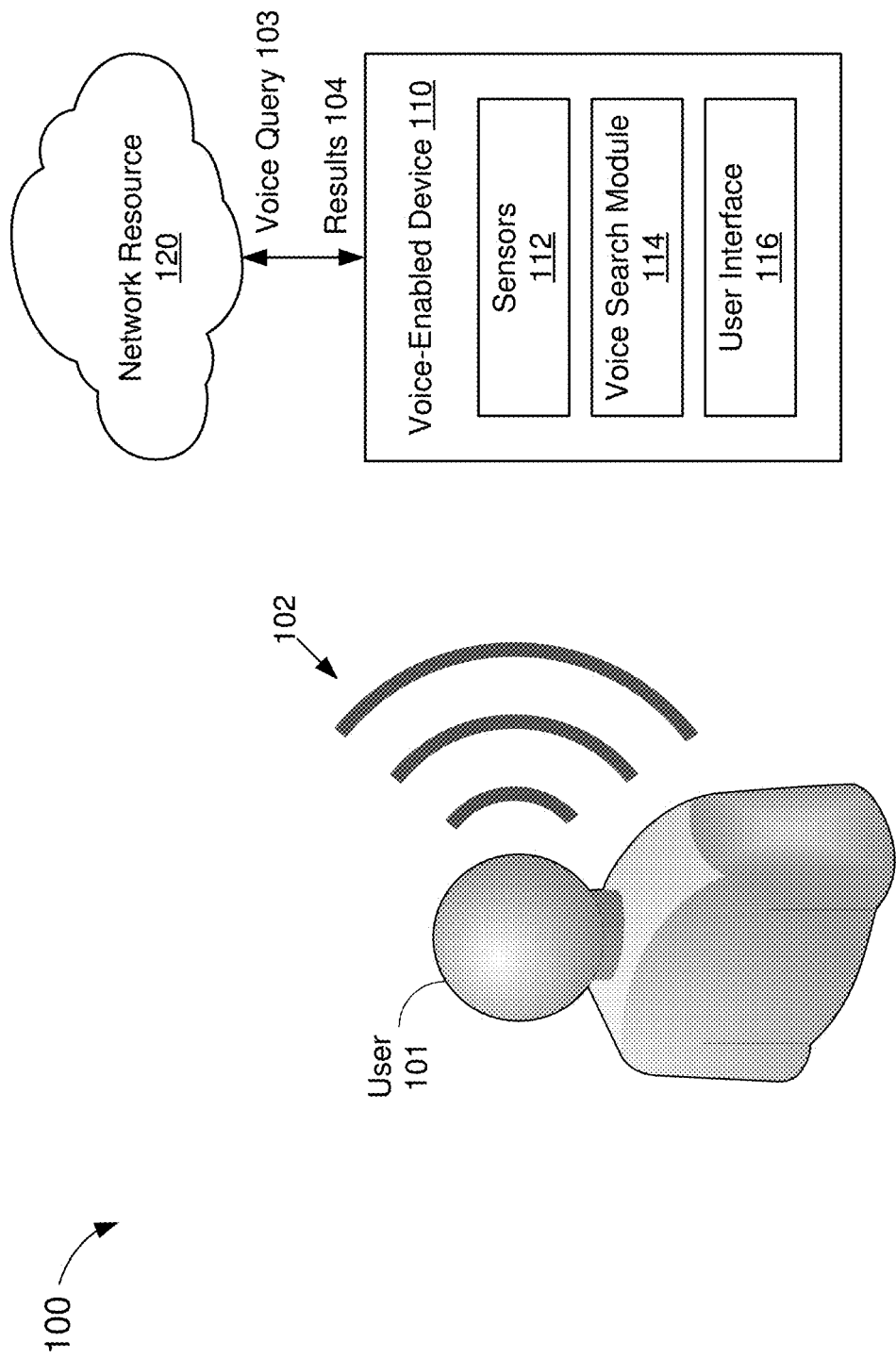
FIG. 1 shows an example voice search system, in accordance with some embodiments.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. The interconnection between circuit elements or software blocks may be shown as buses or as single signal lines. Each of the buses may alternatively be a single signal line, and each of the single signal lines may alternatively be buses, and a single line or bus may represent any one or more of a myriad of physical or logical mechanisms for communication between components.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described above. The non-transitory computer-readable storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein, may refer to any general-purpose processor, conventional processor, controller, microcontroller, and/or state machine capable of executing scripts or instructions of one or more software programs stored in memory. The term "voice-enabled device," as used herein, may refer to any device capable of performing voice search operations and/or responding to voice queries. Examples of voice-enabled devices may include, but are not limited to, smart speakers, home automation devices, voice command devices, virtual assistants, personal computing devices (e.g., desktop computers, laptop computers, tablets, web browsers, and personal digital assistants (PDAs)), data input devices (e.g., remote controls and mice), data output devices (e.g., display screens and printers), remote terminals, kiosks, video game machines (e.g., video game consoles, portable gaming devices, and the like), communication devices (e.g., cellular phones such as smart phones), media devices (e.g., recorders, editors, and players such as televisions, set-top boxes, music players, digital photo frames, and digital cameras), and the like.

FIG. 1 shows an example voice search system 100, in accordance with some embodiments. The system 100 includes a voice-enabled device 110 and a network resource 120. The voice-enabled device 110 may provide hands-free operation by listening and responding to vocal instructions and/or queries from a user 101 (e.g., without any physical contact from the user 101). For example, the user 101 may control the voice-enabled device 110 by speaking to the device 110.

The voice-enabled device 110 includes a plurality of sensors 112, a voice search module 114, and a user interface 116. The sensor 112 may be configured to receive user inputs and/or collect data (e.g., images, video, audio recordings, and the like) about the surrounding environment. Example suitable sensors include, but are not limited to: cameras, capacitive sensors, microphones, and the like. In some aspects, one or more of the sensors 112 (e.g., a microphone) may be configured to listen to and/or record a voice input 102 from the user 101. Example voice inputs may include, but are not limited to, requests for information (e.g., recipes, instructions, directions, and the like), instructions to playback media content (e.g., music, videos, audiobooks, and the like), and/or commands for controlling various devices in the user's home or office environment (e.g., lights, thermostats, garage doors, and other home automation devices).

The voice search module 114 may process the voice input 102 and generate a response. It is noted that, while the sensors 112 may record audio from the surrounding environment, such audio may include the voice input 102 from the user 101 as well as other background noise. Thus, in some aspects, the voice search module 114 may filter any background noise in the audio recorded by the sensors 112 to isolate or at least emphasize the voice input 102. In some embodiments, the voice search module 114 may generate a voice query 103 based on the recorded voice input 102. The voice search module 114 may then transmit the voice query 103 to the network resource 120 for further processing. In some aspects, the voice query 103 may include a transcription of the voice input 102 (e.g., generated using speech recognition techniques). In some other aspects, the voice query 103 may include the audio recording of the voice input 102. Still further, in some aspects, the voice query 103 may include one or more images (or video) captured by a camera of the voice-enabled device 110. For example, the voice query 103 may include the audio recording of the voice input 102 and the one or more captured images or videos.

The network resource 120 may include memory and/or processing resources to generate one or more results 104 for the voice query 103. In some embodiments, the network resource 120 may analyze the voice query 102 to determine how the voice-enabled device 110 should respond to the voice input 102. For example, the network resource 120 may determine whether the voice input 102 corresponds to a request for information, an instruction to playback media content, or a command for controlling one or more home automation devices. In some aspects, the network resource 120 may search one or more networked devices (e.g., the Internet and/or content providers) for the requested information or media content. The network resource 120 may then send the results 104 (e.g., including the requested information, media content, or instructions for controlling the home automation device) back to the voice-enabled device 110.

The voice search module 114 may generate a response to the voice input 102 based, at least in part, on the results 104 received from the voice-enabled device 110. In some aspects, the voice search module 114 may process or render the results 104 in a manner that can be output or otherwise presented to the user 101 via the user interface 116. The user interface 116 may provide an interface through which the voice-enabled device 110 can interact with the user. In some aspects, the user interface 116 may display, play back, or otherwise manifest the results 104 associated with the voice query 103 on the voice-enabled device 110 to provide a response to the voice input 102. For example, the user interface 116 may include one or more speakers, displays, or other media output devices. In some aspects, the user interface 116 may display and/or recite the requested information. In some other aspects, the user interface 116 may playback the requested media content. Still further, in some aspects, the user interface 116 may provide an acknowledgement or confirmation of that the user's command has been executed on the home automation device.

In one or more embodiments, voice-enabled devices are configured to listen for a "trigger word" or "wake word" preceding the voice input. In some aspects, a voice-enabled device may not send a voice query to an associated network resource unless it hears the predetermined trigger word. Aspects of the present disclosure recognize that it may be desirable to reduce or eliminate a voice-enabled device's reliance upon trigger words, for example, because some trigger words may be frequently used in everyday speech or media (e.g., commercials or advertisements). Aspects of the present disclosure also recognize that the user 101 may intend to interact with (e.g. speak to) the voice-enabled device 110 only when the user is paying attention to the device 110. Thus, it may be desirable to determine an attentiveness of the user before triggering a voice search operation on the voice-enabled device 110. Furthermore, attention-based triggers may provide more organic interactions between he user 101 and the voice-enabled device 110, thus improving the overall user experience.

In some embodiments, the voice-enabled device 110 may determine the attentiveness of the user 101 from one or more images captured by the sensors 112. For example, the one or more images may correspond to one or more frames of video captured by a camera (e.g., included with the sensors 112). In some aspects, the voice-enabled device 110 may determine the attentiveness of the user 101 based, at least in part, on a position of the user's body, head, and/or eyes. For example, the voice-enabled device 110 may determine that the user is likely paying attention (and thus intending to speak to the voice-enabled device 110) if the user is facing, looking at, or attending to the voice-enabled device 110.

In some embodiments, the voice-enabled device 110 may selectively transmit the voice query 103 to the network resource 120 based, at least in part, on the attentiveness of the user. In some aspects, the voice-enabled device 110 may begin recording the voice input 102 upon determining that the user 101 is paying attention to the device 110. For example, the voice-enabled device 110 may activate its microphone only when the user 101 is paying attention to the device 110. In some other aspects, the voice-enabled device 110 may first listen for a trigger word before determining whether the user 101 is paying attention to the device 110. For example, the voice-enabled device may activate its microphone upon hearing or detecting the trigger word, and may continue recording the voice inputs 102 (including follow-up queries) as long as the user is paying attention to the device 101 (e.g., without requiring a subsequent trigger word). Accordingly, the voice-enabled device 110 may utilize image capture data from its camera to replace or supplement the trigger word used to trigger voice search operations in voice-enabled devices.

Figure 2:
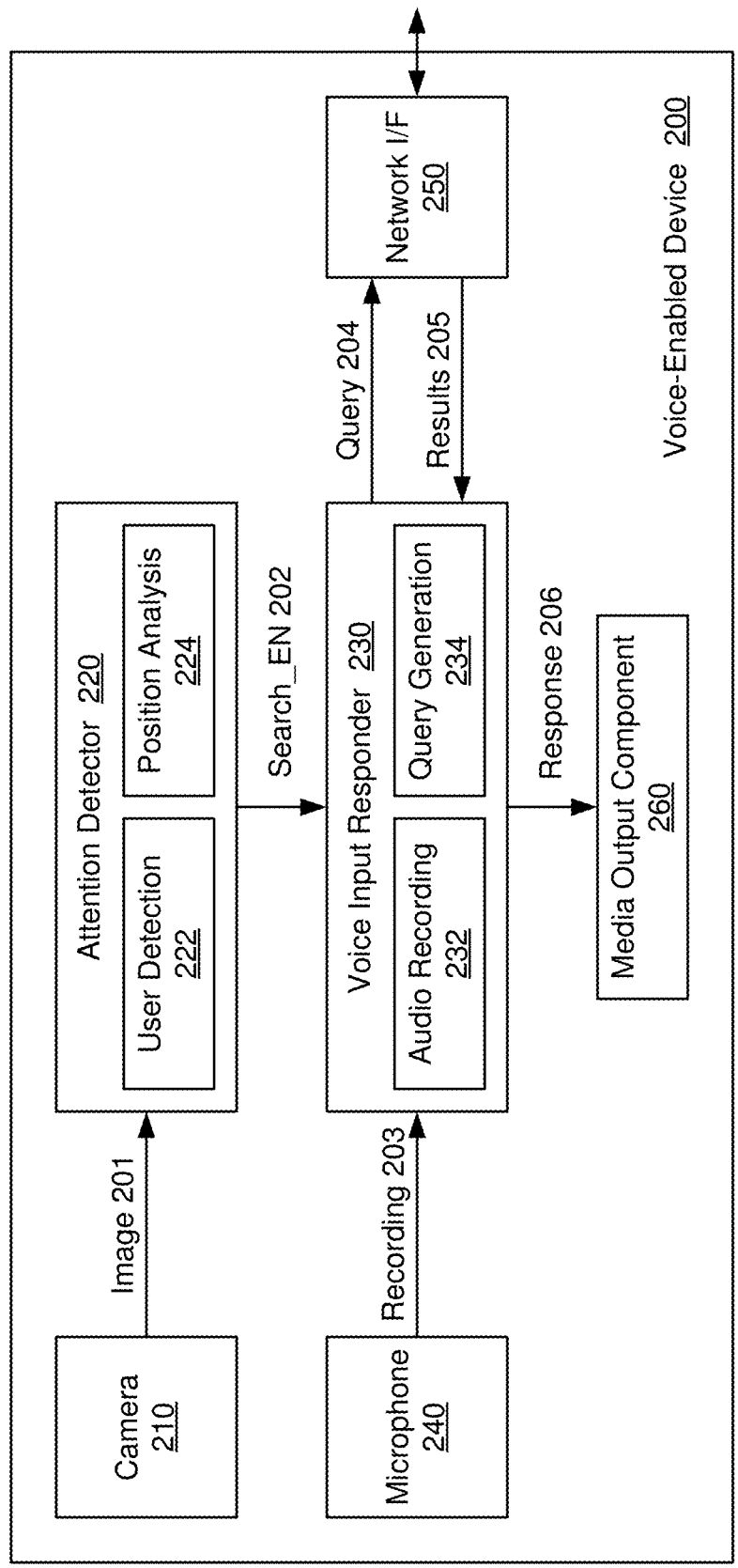
FIG. 2 shows a block diagram of a voice-enabled device, in accordance with some embodiments.

FIG. 2 shows a block diagram of a voice-enabled device 200, in accordance with some embodiments. The voice-enabled device 200 may be an example embodiment of the voice-enabled device 110 of FIG. 1. The voice-enabled device 200 includes a camera 210, an attention detector 220, a voice query responder 230, a microphone 240, a network interface (I/F) 250, and a media output component 260.

The camera 210 is configured to capture one or more images 201 of the environment surrounding the voice-enabled device 200. The camera 210 may be an example embodiment of one of the sensors 112 of FIG. 1. Thus, the camera 210 may be configured to capture images (e.g., still-frame images and/or video) of a scene in front of or proximate the voice-enabled device 200. For example, the camera 210 may comprise one or more optical sensors (e.g., photodiodes, CMOS image sensor arrays, CCD arrays, and/or any other sensors capable of detecting wavelengths of light in the visible spectrum, the infrared spectrum, and/or the ultraviolet spectrum).

The microphone 240 is configured to capture one or more audio recordings 203 from the environment surrounding the voice-enabled device 200. The microphone 240 may be an example embodiment of one of the sensors 112 of FIG. 1. Thus, the microphone 240 may be configured to record audio from scene in front of or proximate the voice-enabled device 200. For example, the microphone 240 may comprise one or more transducers that convert sound waves into electrical signals (e.g., including omnidirectional, unidirectional, or bi-directional microphones and/or microphone arrays).

The attention detector 220 is configured to capture or otherwise acquire one or more images 201 via the camera 210 and generate a search enable (Search_EN) signal 202 based, at least in part, on information determined from the images 201. In some embodiments, the attention detector 220 may include a user detection module 222 and a position analysis module 224. The user detection module 222 may detect a presence of one or more users in the one or more images 201 captured by the camera 210. For example, the user detection module 222 may detect the presence of a user using any know face detection algorithms and/or techniques.

The positional analysis module 224 may determine an attentiveness of each user detected in the one or more images 201. In some embodiments, the positional analysis module 224 may determine the attentiveness of a user based, at least in part, on a position of the user's body, head, and/or eyes. For example, the position analysis module 224 may determine whether a user is paying attention to the voice-enabled device 200 based on the user's body position (e.g., the user's body is facing the device 200), head orientation (e.g., the user's head is facing the device 200), gaze (e.g., the user's eyes are focused on the device 200), gesture (e.g., the user is pointing or otherwise gesturing toward the device 200), or various other attention indicators.

In some embodiments, the attention detector 220 may generate the search enable signal 202 based on the attentiveness of the user (e.g., as determined by the position analysis module 224). In some aspects, the attention detector 220 may assert the search enable signal 202 (e.g., to a logic-high state) if at least one user in the captured images 201 is paying attention to the voice-enabled device 200. In some other aspects, the attention detector 220 may maintain the search enable signal 202 in a deasserted (e.g., logic-low) state as long as the position analysis module 224 does not detect any users to be paying attention to the voice-enabled device 200. The search enable signal 202 may be used to control an operation of the voice query responder 230.

The voice query responder 230 is configured to capture or otherwise acquire one or more audio recordings 203 via the microphone 240 and selectively generate a response 206 based, at least in part, on the search enable signal 202. In some embodiments, the voice query responder 230 may include an audio recording module 232 and a query generation module 234. The audio recording module 232 may control the recording of audio via the microphone 240. In some aspects, the audio recording module 232 may activate or otherwise enable the microphone 240 to capture the audio recordings 203 when the search enable signal 202 is asserted. In some other aspects, the audio recording module 232 may deactivate or otherwise prevent the microphone 240 from capturing audio recordings when the search enable signal 202 is deasserted.

The query generation module 234 is configured to generate a voice query 204 based, at least in part, on the audio recording 203 captured via the microphone 240. For example, the audio recording 203 may include a voice input from one or more of the users detected in one or more of the images 201. In some aspects, the voice query 204 may include at least a portion of the audio recording 203. In some other aspects, the voice query 204 may include a transcription of the audio recording 203. Still further, in some aspects, the voice query 204 may include one or more images 201 captured by the camera 210. For example, the voice query 204 may include the audio recording 203 and the one or more captured images 201. In some embodiments, the query generation module 234 may selectively generate the voice query 204 based, at least in part, on a trigger word. For example, the query generation module 234 may transcribe or convert the audio recording 203 to a voice query 204 only if a trigger word is detected in the audio recording 203 (or a preceding audio recording).

In some other embodiments, the query generation module 234 may selectively generate the voice query 204 based, at least in part, on the search enable signal 202. For example, the query generation module 234 may transcribe or convert the audio recording 203 to a voice query 204 only if the search enable signal 202 is asserted (e.g., without detecting a trigger word). Still further, in some embodiments, the query generation module 234 may selectively generate the voice query 204 based on a combination of the search enable signal 202 and a trigger word. For example, the query generation module 234 may first listen for a trigger word to generate an initial voice query 204 based on a corresponding audio recording 203, and may generate follow-up voice queries 204 (e.g., from subsequent audio recordings 203) as long as the search enable signal 202 is asserted (e.g., without detecting subsequent trigger words).

The voice queries 204 may be transmitted to a network resource (not shown for simplicity) via the network interface 250. As described above, the network resource may include memory and/or processing resources to generate one or more results 205 for the voice query 204. More specifically, the network resource may analyze the voice query 204 to determine how the voice-enabled device 200 should respond to a voice input. For example, the network resource may determine whether the voice input corresponds to a request for information (such as a request for information regarding an object or item captured in the one or more of the images 201 included in the voice query 204), an instruction to playback media content, or a command for controlling one or more home automation devices. In some aspects, the network resource may search one or more networked devices (e.g., the Internet and/or content providers) for the requested information or media content. The network resource may then send the results 205 (e.g., including the requested information, media content, or instructions for controlling the home automation device) back to the voice-enabled device 200.

The voice query responder 230 may receive the results 205 via the network interface 250 and may generate a response 206 to a voice input from the audio recording 203. In some aspects, the voice query responder 230 may process or render the results 205 in a manner that can be output or otherwise presented to the user via the media output component 260. The media output component 260 may be an example embodiment of the user interface 116 of FIG. 1. Thus, the media output component 260 may provide an interface through which the voice-enabled device 200 can interact with the user. In some aspects, the media output component 260 may display, play back, or otherwise manifest the response 206. For example, the media output component 260 may include one or more speakers and/or displays.

Figure 3:
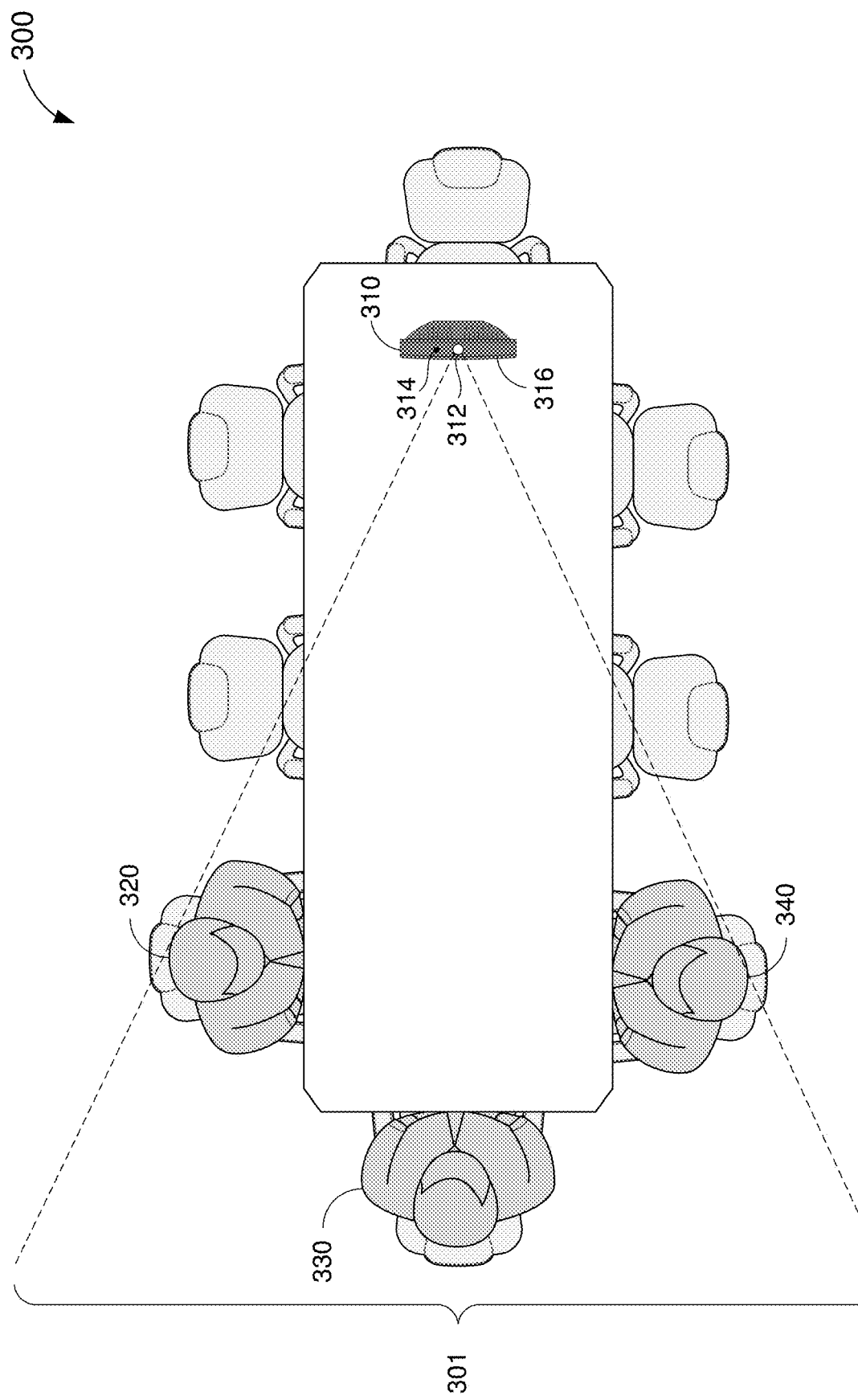
FIG. 3 shows an example environment in which the present embodiments may be implemented.

FIG. 3 shows an example environment 300 in which the present embodiments may be implemented. The environment 300 includes a voice-enabled device 310 and a number of users 320. The voice-enabled device 310 may be an example embodiment of the voice-enabled device 110 of FIG. 1 and/or voice-enabled device 200 of FIG. 2. Thus, the voice-enabled device 310 may provide hands-free operation by listening and responding to vocal instructions and/or queries from one or more of the users 320-340 (e.g., without any physical contact from any of the users 320-340). The voice-enabled device 310 includes a camera 312, a microphone 314, and a media output component 316.

The camera 312 may be an example embodiment of the camera 210 of FIG. 2. More specifically, the camera 312 may be configured to capture images (e.g., still-frame images and/or video) of a scene 301 in front of the voice-enabled device 310. For example, the camera 312 may comprise one or more optical sensors (e.g., photodiodes, CMOS image sensor arrays, CCD arrays, and/or any other sensors capable of detecting wavelengths of light in the visible spectrum, the infrared spectrum, and/or the ultraviolet spectrum).

The microphone 314 may be an example embodiment of the microphone 240 of FIG. 2. More specifically, the microphone 314 may be configured to record audio from the scene 301 (e.g., including voice inputs from one or more of the users 320-340). For example, the microphone 314 may comprise one or more transducers that convert sound waves into electrical signals (e.g., including omnidirectional, uni-directional, or bi-directional microphones and/or microphone arrays).

The media output component 316 may be an example embodiment of the media output component 260 of FIG. 2. More specifically, the media output component 316 may provide an interface through which the voice-enabled device 310 can interact with the users 320-340. In some aspects, the media output component 316 may display, play back, or otherwise manifest a response to a voice input from one or more of the users 320-340. For example, the media output component 316 may include one or more speakers and/or displays.

In some embodiments, the voice-enabled device 310 may selectively perform voice search operations (e.g., by transmitting voice queries to a network resource) based, at least in part, on an attentiveness of one or more of the users 320-340. For example, the voice-enabled device 310 may determine an attentiveness of each of the users 320-340 based on a position of the user's head, body, and/or eyes. It is noted that, in some aspects, the camera 312 may continuously (or periodically) capture images of the scene 301 without any input from any of the users 320-340. In some aspects, the voice-enabled device 310 may detect a presence of each of the users 320-340 in the scene 301 when each user enter into the camera's field of view.

In some embodiments, the voice-enabled device 310 may selectively transmit a voice query to a network resource based, at least in part, on the attentiveness of the users 320-340. In the example of FIG. 3, only user 330 is facing the voice-enabled device 310, whereas users 320 and 340 are facing each other (and away from the device 310). More specifically, the body and/or head position of the user 330 may cause the voice-enabled device 310 to record audio from the scene 301 and transmit at least a portion of the audio recording to the network resource (e.g., as a voice query). In other words, the attentiveness of the user 330 may trigger or otherwise enable the voice-enabled device 310 to record the conversation between the users 320-340 and/or send the recording to an external network.

Aspects of the present disclosure recognize that, while attention-based triggers may reduce the amount of user interaction required to perform a voice search operation (e.g., by eliminating or reducing the use of trigger words), such attention-based triggers are also prone to false trigger scenarios. For example, although the body position of the user 330 may satisfy an attention-based trigger condition (e.g., the user 330 is facing the device 310), the user 330 may not intend to trigger a voice search operation. In other words, the user 330 may be facing the voice-enabled device 310 merely because of where the user 330 is seated at a table. As a result, the user 330 may unintentionally cause the voice-enabled device 310 to record the audio from the scene 301 and/or transmit the audio recording to an external network. This may violate the user's expectation of privacy, as well as those of other users (e.g., users 320 and 340) in the proximity of the voice-enabled device 310.

Thus, in some embodiments, the voice-enabled device 310 may suppress or otherwise prevent the transmission of voice queries to the network resource based, at least in part, on a number of trigger conditions that are satisfied as a result of false triggers. A false trigger may be detected when an attention-based trigger condition is satisfied (e.g., based on a user's body, head, and/or eye position) but no voice input is provided to the voice-enabled device. For example, the user's lips may not move or the user's speech may be incoherent or indecipherable by the voice-enabled device. In some aspects, a false trigger may be detected if the volume of the user's voice is too low (e.g., below a threshold volume level). In some other aspects, a false trigger may be detected if the directionality of the user's voice does not coincide with the location in which the attention-based trigger condition was detected. Still further, in some aspects, a false trigger condition may be detected if the network resource returns an indication of an unsuccessful voice search operation.

If the position of the user 330 causes a threshold number of false trigger detections by the voice-enabled device 310 within a relatively short timeframe, the voice-enabled device 310 may disable its microphone 314 and/or prevent any audio recorded by the microphone 314 to be transmitted to the network service. In other words, the voice-enabled device 310 may determine that, while the user's body position may suggest that the user is paying attention to the voice-enabled device 310, the user may have no intention of interacting with the device 310. Thus, the voice-enabled device 310 may temporarily cease its voice search operations. In some aspects, the voice-enabled device 310 may re-enable voice search operations after a threshold amount of time has passed.

It is noted that, although it may be desirable to suppress attention-based triggers from the user 330 after a threshold number of false triggers are detected, it may not be desirable to suppress attention-based triggers from all other users in the scene 301 (e.g., users 320 and 34). Thus, in some embodiments, the voice-enabled device 310 may suppress attention-based triggers from the user 330 while continuing to allow the users 320 and/or 340 to trigger a voice search operation by turning their attention to the voice-enabled device 310 (e.g., by turning to face the device 310). For example, the voice-enabled device 310 may determine a location of the user 330 relative to the device 310 and suppress attention-based triggers detected only from that location.

In some aspects, the voice-enabled device 310 may determine the location of the user 330 based on information captured by a three-dimensional (3D) camera sensor (e.g., including range or depth information). In some other aspects, the voice-enabled device 310 may estimate the location of the user 330 based on information captured by a two-dimensional (2D) camera sensor (e.g., as described below with respect to FIG. 4).

Figure 4:
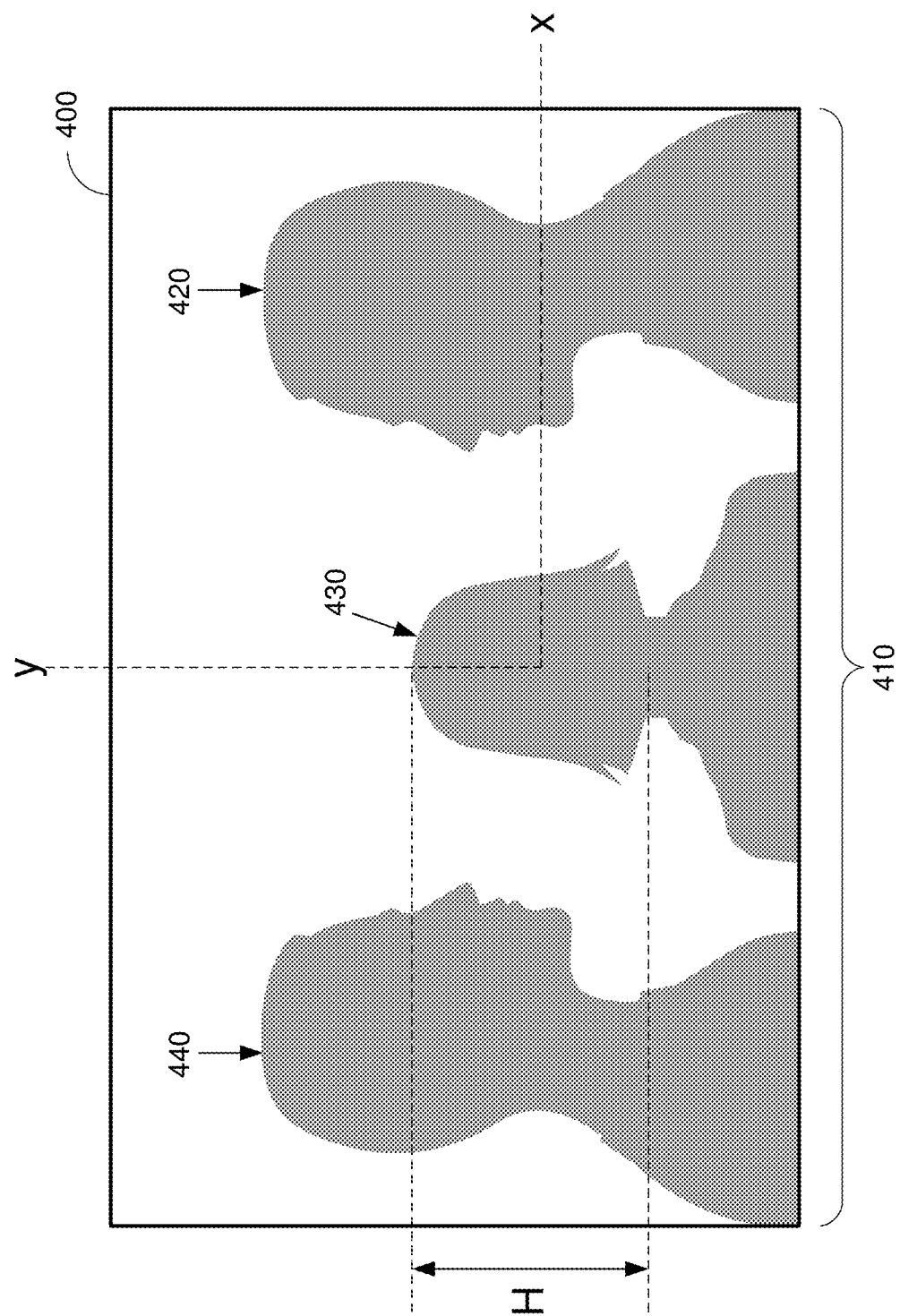
FIG. 4 shows an example image that can be captured by a voice-enabled device, in accordance with some embodiments.

FIG. 4 shows an example image 400 that can be captured by a voice-enabled device. The image 400 is captured from a scene 410 including a number of users 420-440. More specifically, the image 400 may be captured by a 2D camera. With reference for example to FIG. 3, the image 400 may be an example of an image or frame of video captured by the camera 312 of the voice-enabled device 310. Thus, the users 420-440 may correspond to the users 320-340, respectively, of FIG. 3.

In the example of FIG. 4, only the user 430 is facing the voice-enabled device, whereas users 420 and 440 are facing each other (and away from the device). Thus, the body and/or head position of the user 430 may satisfy an attention-based trigger condition of the voice-enabled device. In other words, the attentiveness of the user 430 may cause the voice-enabled device to record audio from the scene 401 and transmit at least a portion of the audio recording to an external network resource (e.g., as a voice query). In some embodiments, the attention-based trigger condition may be satisfied as a result of a false trigger. For example, although the body position of the user 430 may satisfy an attention-based trigger condition (e.g., the user 430 is facing the voice-enabled device), the user 430 may not intend to trigger a voice search operation.

In some embodiments, the voice-enabled device may suppress attention-based triggers originating from the location of the user 430. In some aspects, the voice-enabled device may determine a relative location of the user 430 (e.g., relative to the voice-enabled device) based, at least in part, on a position of the user's head within the image 400. For example, the center of the user's head may be described using cartesian coordinates (x, y) relative to the horizontal and vertical axes of the images 400. The depth or distance (z) of the user 430 can be estimated based on the height (H) of the user's head. It is noted that the height of the user's head is greater when the user is closer to the voice-enabled device and smaller when the user is further from the device. Thus, in some implementations, the measured head height $H_s$ may be compared to a known head height of the user (or an average head height, when the user's actual head height is not known) calibrated at a predetermined distance $z_0$ from the voice-enabled device to determine the relative distance of the user 430 from the voice-enabled device. In some other implementations, the voice-enabled device may estimate a 3D projection of the 2D coordinates of the user's facial features (e.g., where the 2D camera has been initially calibrated to have a particular focal length, distortion, etc.).

Accordingly, each attention-based trigger can be associated with a translation vector (T), defined as:

$$T=(x,y,z)$$

where T represents a 3D translation with respect to the voice-enabled device (or a camera of the voice-enabled device).

Upon determining that a threshold number of false triggers have been detected from the location of the user 430 within a relatively short (e.g., threshold) duration, the voice-enabled device may suppress any subsequent attention-based triggers associated with the given translation vector T. In this manner, the voice-enabled device may suppress attention-based triggers originating only from the location of the user 430, while still being able to detect attention-based triggers from the either of the remaining users 420 and 440.

Figure 5:
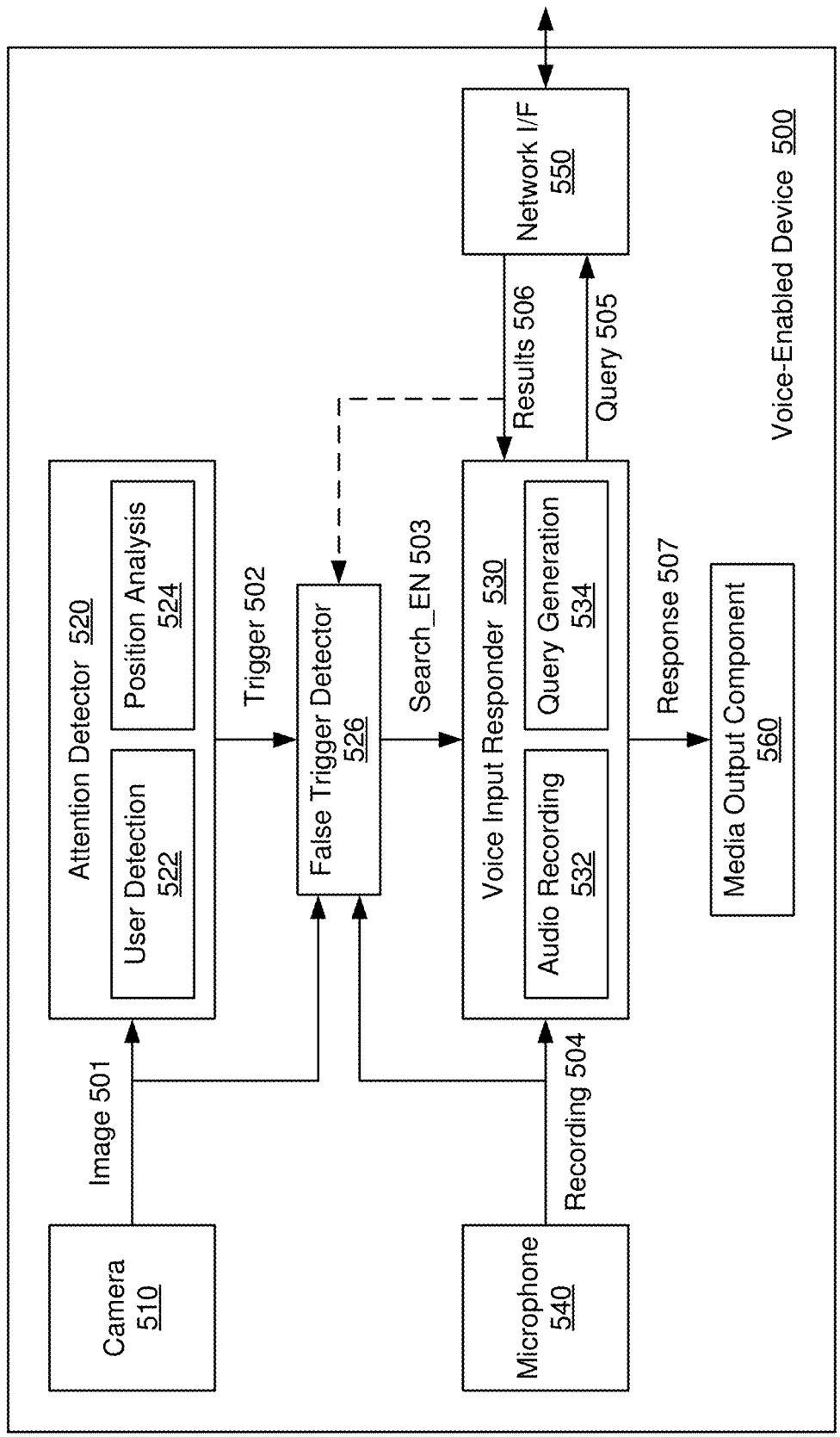
FIG. 5 shows a block diagram of a voice-enabled device with false trigger detection, in accordance with some embodiments.

FIG. 5 shows a block diagram of a voice-enabled device 500 with false trigger detection, in accordance with some embodiments. The voice-enabled device 500 may be an example embodiment of the voice-enabled device 110 of FIG. 1 and/or voice-enabled device 300 of FIG. 3. The voice-enabled device 500 includes a camera 510, an attention detector 520, a false trigger detector 526, a voice query responder 530, a microphone 540, a network interface (I/F) 550, and a media output component 560.

The camera 510 is configured to capture one or more images 501 of the environment surrounding the voice-enabled device 500. The camera 510 may be an example embodiment of one of the sensors 112 of FIG. 1, the camera 210 of FIG. 2, and/or the camera 312 of FIG. 3. Thus, the camera 510 may be configured to capture images (e.g., still-frame images and/or video) of a scene in front of or proximate the voice-enabled device 500. For example, the camera 510 may comprise one or more optical sensors (e.g., photodiodes, CMOS image sensor arrays, CCD arrays, and/or any other sensors capable of detecting wavelengths of light in the visible spectrum, the infrared spectrum, and/or the ultraviolet spectrum).

The microphone 540 is configured to capture one or more audio recordings 504 from the environment surrounding the voice-enabled device 500. The microphone 540 may be an example embodiment of one of the sensors 112 of FIG. 1, the microphone 240 of FIG. 2, and/or the microphone 314 of FIG. 3. Thus, the microphone 540 may be configured to record audio from scene in front of or proximate the voice-enabled device 500. For example, the microphone 540 may comprise one or more transducers that convert sound waves into electrical signals (e.g., including omnidirectional, uni-directional, or bi-directional microphones and/or microphone arrays).

The attention detector 520 is configured to capture or otherwise acquire one or more images 501 via the camera 510 and generate a trigger signal 502 based, at least in part, on information determined from the images 501. In some embodiments, the attention detector 520 may include a user detection module 522 and a position analysis module 524. The user detection module 522 may detect a presence of one or more users in the one or more images 501 captured by the camera 510. For example, the user detection module 522 may detect the presence of a user using any know face detection algorithms and/or techniques.

The positional analysis module 524 may determine an attentiveness of each user detected in the one or more images 501. In some embodiments, the positional analysis module 524 may determine the attentiveness of a user based, at least in part, on a position of the user's body, head, and/or eyes. For example, the position analysis module 524 may determine whether a user is paying attention to the voice-enabled device 500 based on the user's body position (e.g., the user's body is facing the device 500), head orientation (e.g., the user's head is facing the device 500), gaze (e.g., the user's eyes are focused on the device 500), gesture (e.g., the user is pointing or otherwise gesturing toward the device 500), or various other attention indicators.

In some embodiments, the attention detector 520 may generate the trigger signal 502 based on the attentiveness of the user (e.g., as determined by the position analysis module 524). In some aspects, the attention detector 520 may assert the trigger signal 502 (e.g., to a logic-high state) if at least one user in the captured images 501 is paying attention to the voice-enabled device 500. In some other aspects, the attention detector 520 may maintain the trigger signal 502 in a deasserted (e.g., logic-low) state as long as the position analysis module 524 does not detect any users to be paying attention to the voice-enabled device 500.

The false trigger detector 526 is configured to generate a search enable (search_EN) signal 503 based, at least in part, on a state of the trigger signal 502. In some embodiments, when the trigger signal 502 is asserted (e.g., indicating an attention-based trigger condition is satisfied), the false trigger detector 526 may determine whether the attention-based trigger condition is satisfied as a result of a false trigger. For example, a false trigger may be detected when an attention-based trigger condition is satisfied (e.g., based on a user's body, head, and/or eye position) but no voice input is provided to the voice-enabled device 500. In some aspects, the false trigger detector 526 may detect false triggers based at least in part on images captured via the camera 510, audio recordings 504 captured via the microphone 540, and/or voice query results 506 received via the network interface 550. For example, the false trigger detector 526 may detect false triggers based on an amount of movement of the user's lips, the volume of the user's voice, the directionality of the user's voice, an indication from the network service of a successful (or unsuccessful) voice search operation, and various other false trigger indicators.

In some embodiments, the false trigger detector 526 may maintain the search enable signal 503 in a deasserted (e.g., logic-low) state as long as the trigger signal 502 is also deasserted. When the trigger signal 502 is asserted, the false trigger detector 526 may selectively assert the search enable signal 503 based, at least in part, on whether the trigger condition is satisfied as a result of a false trigger. In some embodiments, the false trigger detector 526 may suppress the search enable signal 503 when a threshold number of false triggers have been detected from the same location (x, y, z) in a relatively short time period. For example, while suppressing the search enable signal 503, the false trigger detector 526 may maintain the search enable signal 503 in the deasserted state in response to any subsequent attention-based triggers originating from the location (x, y, z). In some other embodiments, the false trigger detector 526 may restore the search enable signal 502 (e.g., to a logic-high) state after a threshold amount of time has passed with little or no false triggers detected from the location (x, y, z). For example, upon restoring the search enable signal 503, the false trigger detector 526 may assert the search enable signal 503 to the logic-high state in response to any subsequent attention-based triggers origination from the location (x, y, z).

The voice query responder 530 is configured to capture or otherwise acquire one or more audio recordings 504 via the microphone 540 and selectively generate a response 507 based, at least in part, on the search enable signal 503. In some embodiments, the voice query responder 530 may include an audio recording module 532 and a query generation module 534. The audio recording module 532 may control the recording of audio via the microphone 540. In some aspects, the audio recording module 532 may activate or otherwise enable the microphone 540 to capture the audio recordings 504 when the search enable signal 503 is asserted. In some other aspects, the audio recording module 532 may deactivate or otherwise prevent the microphone 540 from capturing audio recordings when the search enable signal 503 is deasserted.

The query generation module 534 is configured to generate a voice query 505 based, at least in part, on the audio recording 504 captured via the microphone 540. For example, the audio recording 504 may include a voice input from one or more of the users detected in one or more of the images 501. In some aspects, the voice query 505 may include at least a portion of the audio recording 504. In some other aspects, the voice query 505 may include a transcription of the audio recording 504. Still further, in some aspects, the voice query 505 may include one or more images 501 captured by the camera 510. For example, the voice query 505 may include the audio recording 504 and the one or more captured images 501. In some embodiments, the query generation module 534 may selectively generate the voice query 505 based, at least in part, on a trigger word. For example, the query generation module 534 may transcribe or convert the audio recording 504 to a voice query 505 only if a trigger word is detected in the audio recording 504 (or a preceding audio recording).

In some other embodiments, the query generation module 534 may selectively generate the voice query 505 based, at least in part, on the search enable signal 503. For example, the query generation module 534 may transcribe or convert the audio recording 504 to a voice query 505 only if the search enable signal 503 is asserted (e.g., without detecting a trigger word). Still further, in some embodiments, the query generation module 534 may selectively generate the voice query 505 based on a combination of the search enable signal 503 and a trigger word. For example, the query generation module 534 may first listen for a trigger word to generate an initial voice query 505 based on a corresponding audio recording 504, and may generate follow-up voice queries 505 (e.g., from subsequent audio recordings 504) as long as the search enable signal 503 is asserted (e.g., without detecting subsequent trigger words).

The voice queries 505 may be transmitted to a network resource (not shown for simplicity) via the network interface 550. As described above, the network resource may include memory and/or processing resources to generate one or more results 506 for the voice query 505. More specifically, the network resource may analyze the voice query 505 to determine how the voice-enabled device 500 should respond to a voice input. For example, the network resource may determine whether the voice input corresponds to a request for information (such as a request for information regarding an object or item captured in the one or more images 201 included in the voice query 204), an instruction to playback media content, or a command for controlling one or more home automation devices. In some aspects, the network resource may search one or more networked devices (e.g., the Internet and/or content providers) for the requested information or media content. The network resource may then send the results 506 (e.g., including the requested information, media content, or instructions for controlling the home automation device) back to the voice-enabled device 500.

The voice query responder 530 may receive the results 506 via the network interface 550 and may generate a response 507 to a voice input from the audio recording 504. In some aspects, the voice query responder 530 may process or render the results 506 in a manner that can be output or otherwise presented to the user via the media output component 560. The media output component 560 may be an example embodiment of the user interface 116 of FIG. 1. Thus, the media output component 560 may provide an interface through which the voice-enabled device 500 can interact with the user. In some aspects, the media output component 560 may display, play back, or otherwise manifest the response 507. For example, the media output component 560 may include one or more speakers and/or displays.

Figure 6:
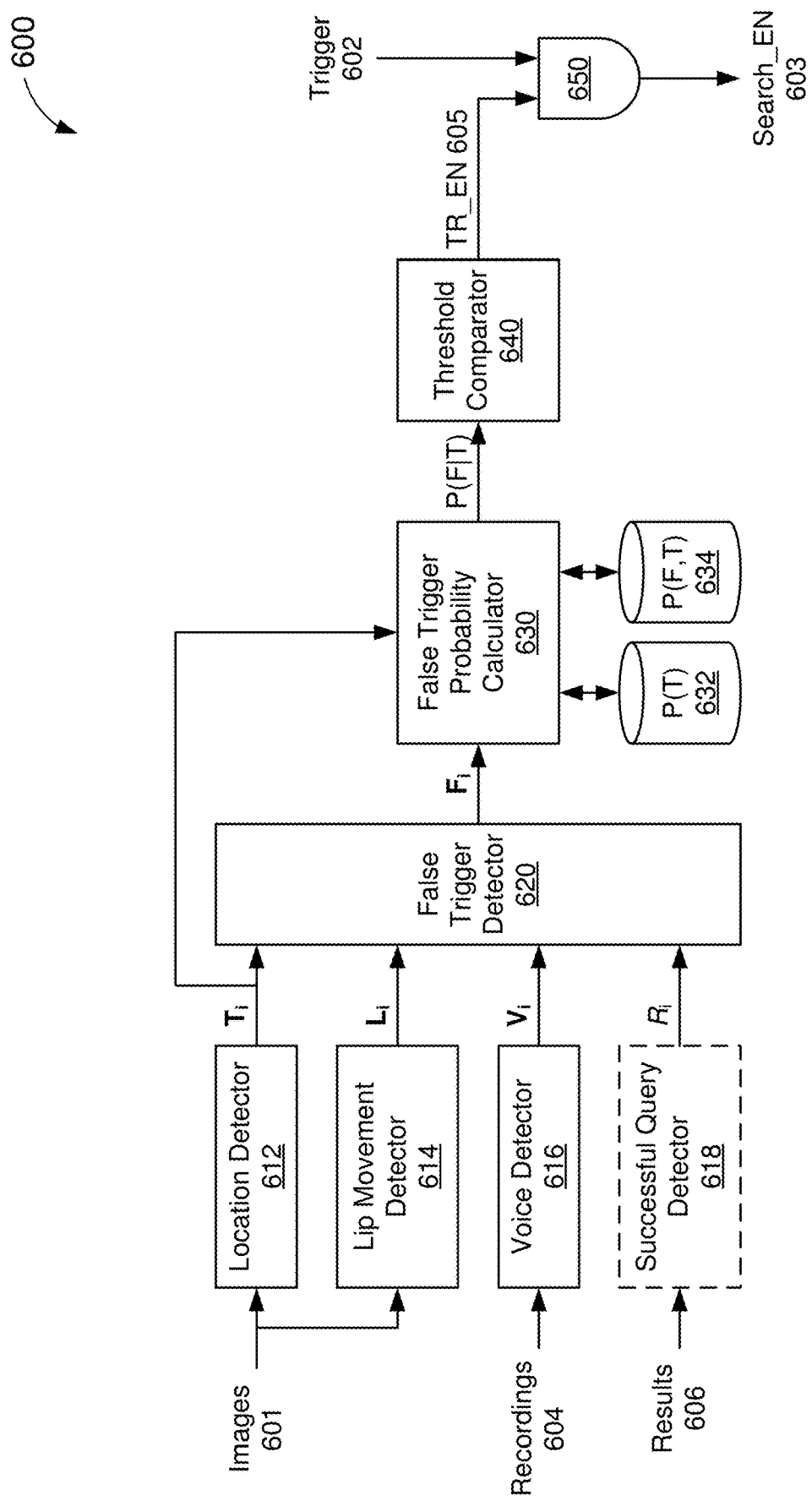
FIG. 6 shows a block diagram of a false trigger detection circuit, in accordance with some embodiments.

FIG. 6 shows a block diagram of a false trigger detection circuit 600, in accordance with some embodiments. With reference for example to FIG. 5, the false trigger detection circuit 600 may be an example embodiment of the false trigger detector 526 of the voice-enabled device 500. Thus, the false trigger detection circuit 600 may determine, when an attention-based trigger condition is satisfied, whether the trigger condition is satisfied as a result of a false trigger. More specifically, the false trigger detection circuit 600 may determine whether a user intends to perform a voice search operation or otherwise interact with the voice-enabled device when the user's head, body, and/or eye position indicates that the user is paying attention to the device.

The false trigger detection circuit 600 includes a location detector 612, a lip movement detector 614, a voice detector 616, a false trigger detector 620, a false trigger probability calculator 630, and a threshold comparator 640. The location detector 612 is configured to detect a location of a user relative to the voice-enabled device based on one or more images 601 acquired via a camera sensor. With reference for example to FIG. 5, the images 601 may be an example embodiment of the images 501 captured by the camera 510. Each user's location can be determined, for example, using information acquired by a 3D camera or a 2D camera (e.g., using the techniques described above with respect to FIG. 4). In some embodiments, the location detector 612 may determine a set of translation vectors ($T_i$) that describes the location of each user that satisfies an attention-based trigger condition in the $i^{th}$ frame or image 601:

$$T_i = \{T_{i,1}, T_{i,2}, \ldots, T_{i,K}\}$$

where K represents the number of attention-based triggers (e.g., for different users) detected in the given frame or image 601 and $T_{i,j}$ is the translation vector associated with each trigger (e.g., $T_{i,j} = (x, y, z)$).

The lip movement detector 614 is configured to detect an amount of lip movement by a user based on the one or more images 601 acquired via the camera sensor. The amount of lip movement may be determined, for example, using neural network models and/or machine learning techniques that can detect and analyze the lips of each user in the images 601. In some embodiments the lip movement detector 614 may determine a set of lip-movement vectors ($L_i$) that describes the amount of lip movement of each user that satisfies an attention-based trigger condition in the $i^{th}$ frame or image 601:

$$L_i = \{L_{i,1}, L_{i,2}, \ldots, L_{i,K}\}$$

where K represents the number of attention-based triggers (e.g., for different users) detected in the given frame or image 601 and $L_{i,j}$ is the lip-movement vector associated with each trigger.

The voice detector 616 is configured to detect one or more characteristics of a user's voice based on one or more audio recordings 604 acquired via a microphone sensor. With reference for example to FIG. 5, the audio recordings 604 may be an example embodiment of the audio recordings 504 captured by the microphone 540. In some embodiments, the voice detector 616 may detect the volume level of a user's voice in the audio recordings 604. In some other embodiments, the voice detector 616 may detect a directionality of a user's voice in the audio recordings 604 (e.g., where the microphone 540 comprises a microphone array). The voice characteristics may be determined, for example, using neural network models and/or machine learning techniques that can detect and analyze the distance, direction, and/or tonal characteristics of each voice input in the audio recordings 604. In some embodiments, the voice detector 616 may determine a set of voice vectors ($V_i$) that describes the volume level and/or directionality of each voice input associated with an attention-based trigger condition in the $i^{th}$ frame or image 601:

$$V_i = \{V_{i,1}, V_{i,2}, \ldots, V_{i,K}\}$$

where K represents the number of attention-based triggers (e.g., for different users) detected in the given frame or image 601 and $V_{i,j}$ is the voice vector associated with each trigger. In some embodiments, where the voice-enabled device is unable to distinguish voice inputs from multiple sources in different directions, the set $V_i$ may contain only one voice vector for the entire set of attention-based triggers $T_i$.

In some embodiments, the false trigger detection circuit 600 may further include a successful query detector 618 to determine whether an attention-based trigger resulted in a successful voice search operation based on one or more results 606 received from a network resource. With reference for example to FIG. 5, the results 606 may be an example embodiment of the results 506 received via the network interface 550. For example, some network resources may return an unsuccessful voice search indication (e.g., included with the results 606) when the network resource is unable to understand or process a given voice query (e.g., due to the absence of a human voice signature or any meaningful commands, low quality of sound, and/or presence of meaningless human voice in the voice query). Thus, in some embodiments, the successful query detector 618 may determine a response variable ($R_i$) indicating whether an attention-based trigger in the $i^{th}$ frame or image 601 resulted in a successful (or unsuccessful) voice search operation:

$$R_i \in \{1,0\}$$

In some embodiments, the false trigger detector 620 may determine whether an attention-based trigger condition was satisfied as a result of a false trigger based, at least in part, on the outputs of the location detector 612, the lip movement detector 614, the voice detector 616, and/or the successful query detector 618. For example, the false trigger detector 620 may determine a set of false trigger variables ($F_i$) indicating the probability or likelihood of a false trigger associated with each user that satisfies an attention-based trigger condition in the $i^{th}$ frame or image 601:

$$F_i = \{F_{i,1}, F_{i,2}, \ldots, F_{i,K}\}$$

$$F_{i,j} = f(T_{i,j}, L_{i,j}, V_{i,j}, R_i)$$

where K represents the number of attention-based triggers (e.g., for different users) detected in the given frame or image 601 and $F_{i,j}$ is the false trigger variable associated with each false trigger. In some embodiments, the false trigger variable may contain a Boolean value indicating whether or not a false trigger is detected (e.g., $F_{i,j} \in \{0,1\}$). In some other embodiments, the false trigger variable may be expressed in terms of a continuous range of values indicating a probability or likelihood of a false trigger being detected (e.g., $F_{i,j} \in (0,1)$).

In some embodiments, the false trigger detector 620 may determine the likelihood of a false trigger $F_{i,j}$ as a function f( ) of the input variables (e.g., $T_{i,j}$, $L_{i,j}$, $V_{i,j}$, and $R_i$). In the example of FIG. 6, the false trigger detector 620 determines the false trigger variable $F_{i,j}$ as a function of only four variables. However, in actual implementations, the false trigger detector 620 may determine the false trigger variable $F_{i,j}$ as a function of fewer or more variables than those depicted in FIG. 6. For example, other input variables may include, but are not limited to, a direction of the user's gaze and/or the user's head orientation. In some embodiments, the function f( ) may be generated using machine learning techniques. In some other embodiments, the function f( ) may be a linear combination of the input variables, using a set of fixed weights (α, β, γ):

$$f(T_{i,j}, L_{i,j}, V_{i,j}, R_i) = 1 - (\alpha P(L_{i,j}) + \beta P(V_{i,j}) + \gamma P(R_i)) \alpha, \beta, \gamma$$
$$\in [0,1]^* \alpha + \beta + \gamma = 1$$

where $P(L_{i,j})$ represents the likelihood of false trigger given the amount of lip movement $L_{i,j}$, $P(V_{i,j})$ represents the likelihood of a false trigger given the volume level and/or directionality of the user's voice $V_{i,j}$, and $P(R_i)$ represents the likelihood of a false trigger given the successful query indication $R_i$. In some embodiments, the translation vector $T_{i,j}$ may be used to determine the weighting factors (α, β, γ) based on the distance of each user from the voice-enabled device. For example, lip movement may be difficult to detect and/or analyze beyond a certain distance.

The false trigger probability calculator 630 may determine and/or update a probability distribution P(F|T) indicating the likelihood of an attention-based trigger condition being satisfied at a particular location as a result of a false trigger. For example, the false trigger probability calculator 630 may update a marginal distribution P(T) of a trigger condition being satisfied at a particular location and a joint distribution P(F,T) of a false trigger being detected at that location. In some embodiments, the probability distributions P(T) and P(F,T) can be stored in a queue of size ⌈r·w⌉, where r is the frame rate of the camera (e.g., the rate at which the images 601 are captured or acquired) and w is a temporal window over which the false trigger probability calculator 630 may update the probability distributions P(T) and P(F, T). In some aspects, the temporal window w may encompass a relatively short duration (e.g., 60 s) from the time an attention-based trigger is detected. In some other aspects, the temporal window w may encompass a much longer duration (e.g., one or more days).

In some other embodiments, the marginal distributions P(T) may be stored in a marginal distribution database 632 and the joint distributions P(F,T) may be stored in a joint distribution database 634. For example, each of the databases 632 and 634 may store a three-dimensional table corresponding to discretized locations (x, y, z) in the image captures space. At each discrete location ($x_i$, $y_i$, $z_i$), the marginal distribution database 632 may store a probability of an attention-based trigger being detected at that location P(T=$x_i$, $y_i$, $z_i$), and the joint distribution database 634 may store a probability of the attention-based trigger being detected as a result of a false trigger P(F,T=$x_i$, $y_i$, $z_i$) and a probability of the attention-based trigger being detected not as a result of a false trigger P($\bar{F}$,T=$x_i$, $y_i$, $z_i$).

The false trigger probability calculator 630 may update the probabilities P(T) and P(F,T) at each discretized location (x, y, z) based on the set of translation vectors $T_i$ and false trigger values $F_i$. In some aspects, the updates at each location (x, y, z) may be modeled after a gaussian distribution G(T) (or other distribution learned or defined according to a specific estimation noise model) centered at the location of each attention-based trigger ($x_i$, $y_i$, $z_i$):

$$P(F,T) \leftarrow (1-u)P(F,T) + uG(T)$$

$$P(T) \leftarrow (1-u)P(T) + uG(T)$$

where u represents a step function corresponding to the degree to which the probabilities P(F,T) and P(T) are to be updated for a given temporal window (w) and frame rate (r):

$$u = \frac{1}{r \cdot w}, u \in (0, 1)$$

Using the equations above, each of the bins (x, y, z) of the probability databases 632 and 634 may be updated for each image 601 received by the false trader detection circuit 600.

In other words, the marginal probability P(T) may be increased (or incremented) at any location(s) where an attention-based trigger condition is satisfied, with the probability P(T) centered at the translation vector $T_{i,j}$ being increased by the greatest amount. Similarly, the joint probability P(F,T), or P(F̄,T), may be increased (or incremented) at any location(s) where a false trigger is detected, with the probability P(F,T) or P(F̄,T) centered at the translation vector $T_{i,j}$ being increased by the greatest amount. It is noted that, if the probability P(T) or P(F,T) in a certain bin is not increased (e.g., because no attention-based trigger was detected around that location), then it is effectively decreased by multiplying that probability by (1−u). Because u is a fractional value (e.g., u<1), each update may have a marginal effect on the probability distributions P(T) and P(F,T).

After updating the probability distributions P(T) and P(F,T), the false trigger probability calculator 630 may calculate the probability distribution P(F|T) indicating the likelihood of an attention-based trigger condition being satisfied at a particular location as a result of a false trigger:

$$P(F|T) = \frac{P(F,T)}{P(T)}$$

The threshold comparator 640 compares the probability distribution P(F|T) with a probability threshold $P_{TH}$ to determine whether to suppress attention-based triggers originating from a particular location. For example, if the probability P(F|T) exceeds the probability threshold $P_{TH}$ (e.g., P(F|T)>$P_{TH}$) at any given location (x, y, z), the threshold comparator 640 may suppress attention-based triggers from that location. In some aspects, the threshold comparator 640 may assert a trigger enable (TR_EN) signal 605 if the probability distribution P(F|T) does not exceed the probability threshold $P_{TH}$ (e.g., at any location). In some other aspects, the threshold comparator 640 may deassert the trigger enable signal 605 if any of the probabilities P(F|T) exceeds the probability threshold $P_{TH}$. Still further, in some aspects, the threshold comparator 640 may assert the trigger enable signal 605 only if the probability distribution P(F|T) does not exceed the probability threshold $P_{TH}$ and the marginal probability distribution P(T) also does not exceed a marginal probability threshold $P_{TH\_M}$ (e.g., P(F|T)<$P_{TH}$ & P(T)<$P_{TH\_M}$).

The trigger enable signal 605 may be used to selectively assert or deassert the search enable signal 603. In some embodiments, the trigger enable signal 605 may be combined with a trigger signal 605, through an AND logic gate 650, to produce the search enable signal 603. With reference for example to FIG. 5, the trigger signal 602 may be an example embodiment of the trigger signal 502 generated by the attention detector 520 and the search enable signal 603 may be an example embodiment of the search enable signal 503 generated by the false trigger detector 526. Accordingly, the search enable signal 603 may be asserted only if the trigger enable signal 605 and the trigger signal 602 are asserted. Similarly, the search enable signal 603 may be deasserted as long as one of the trigger enable signal 605 or the trigger signal 602 is deasserted.

Figure 7:
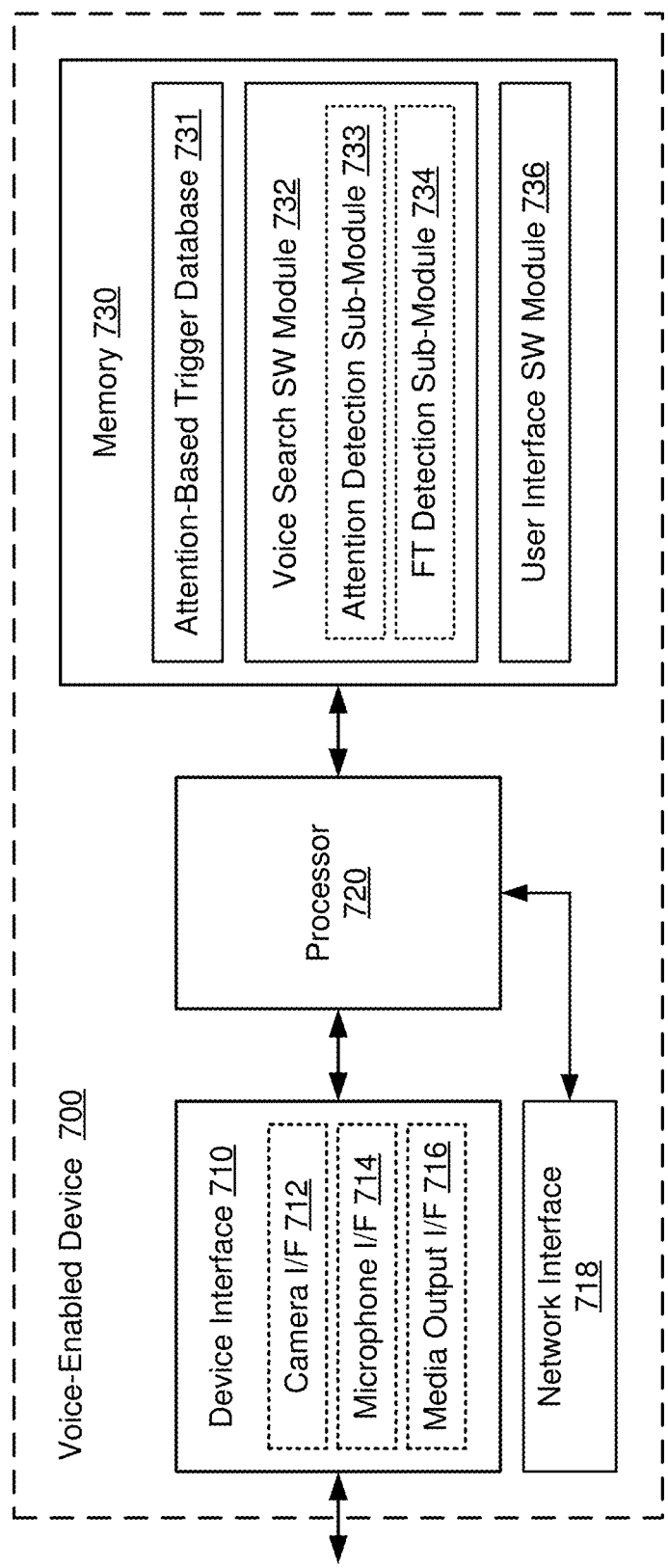
FIG. 7 shows another block diagram of a voice-enabled device, in accordance with some embodiments.

FIG. 7 shows another block diagram of a voice-enabled device 700, in accordance with some embodiments. The voice-enabled device 700 may be an example embodiment of any of the voice enabled devices 110, 200, 310, and/or 500 described above with respect to FIGS. 1-3 and 5. The voice-enabled device 700 includes a device interface 710, a network interface 718, a processor 720, and a memory 730.

The device interface 710 may include a camera interface 712, a microphone interface 714, and a media output interface 716. The camera interface 712 may be used to communicate with a camera of the voice-enabled device 700 (e.g., camera 210 of FIG. 2 and/or camera 510 of FIG. 5). For example, the camera interface 712 may transmit signals to, and receive signals from, the camera to capture an image of a scene facing the voice-enabled device 700. The microphone interface 714 may be used to communicate with a microphone of the voice-enabled device 700 (e.g., microphone 240 of FIG. 2 and/or microphone 540 of FIG. 5). For example, the microphone interface 714 may transmit signals to, and receive signals from, the microphone to record audio from the scene.

The media output interface 716 may be used to communicate with one or more media output components of the voice-enabled device 700. For example, the media output interface 716 may transmit information and/or media content to the media output components (e.g., speakers and/or displays) to render a response to a user's voice input or query. The network interface 718 may be used to communicate with a network resource external to the voice-enabled device 700 (e.g., network resource 120 of FIG. 1). For example, the network interface 718 may transmit voice queries to, and receive results from, the network resource.

The memory 730 includes an attention-based trigger database 731 to store a history and/or likelihood of attention-based triggers being detected by the voice-enabled device 700. For example, the attention-based trigger database 731 may include the probability distribution databases 632 and 634 of FIG. 6. The memory 730 may also include a non-transitory computer-readable medium (e.g., one or more nonvolatile memory elements, such as EPROM, EEPROM, Flash memory, a hard drive, etc.) that may store at least the following software (SW) modules:

- a voice search SW module 732 to selectively transmit a voice query to a network resource based at least in part on an attentiveness of one or more users detected by the voice-enabled device 700, the voice search SW module 732 further including:
  - an attention detection sub-module 733 to determine whether the attentiveness of the one or more users satisfies a trigger condition for transmitting the voice query to the network resource; and
  - a false trigger (FT) detection sub-module 734 to determine whether the trigger condition is satisfied as a result of a false trigger; and
- a user interface SW module 536 to playback or render one or more results of the voice query received from the network resource.

Each software module includes instructions that, when executed by the processor 720, cause the voice-enabled device 700 to perform the corresponding functions. The non-transitory computer-readable medium of memory 730 thus includes instructions for performing all or a portion of the operations described below with respect to FIGS. 8 and 9.

Processor 720 may be any suitable one or more processors capable of executing scripts or instructions of one or more software programs stored in the voice-enabled device 700. For example, the processor 720 may execute the voice search SW module 732 to selectively transmit a voice query to a network resource based at least in part on an attentiveness of one or more users detected by the voice-enabled device 700. In executing the voice search SW module 732, the processor 720 may further execute the attention detection sub-module 733 to determine whether the attentiveness of the one or more users satisfies a trigger condition for transmitting the voice query to the network resource, and the FT detection sub-module 734 to determine whether the trigger condition is satisfied as a result of a false trigger. The processor 520 may also execute the user interface SW module 536 to playback or render one or more results of the voice query received from the network resource.

Figure 8:
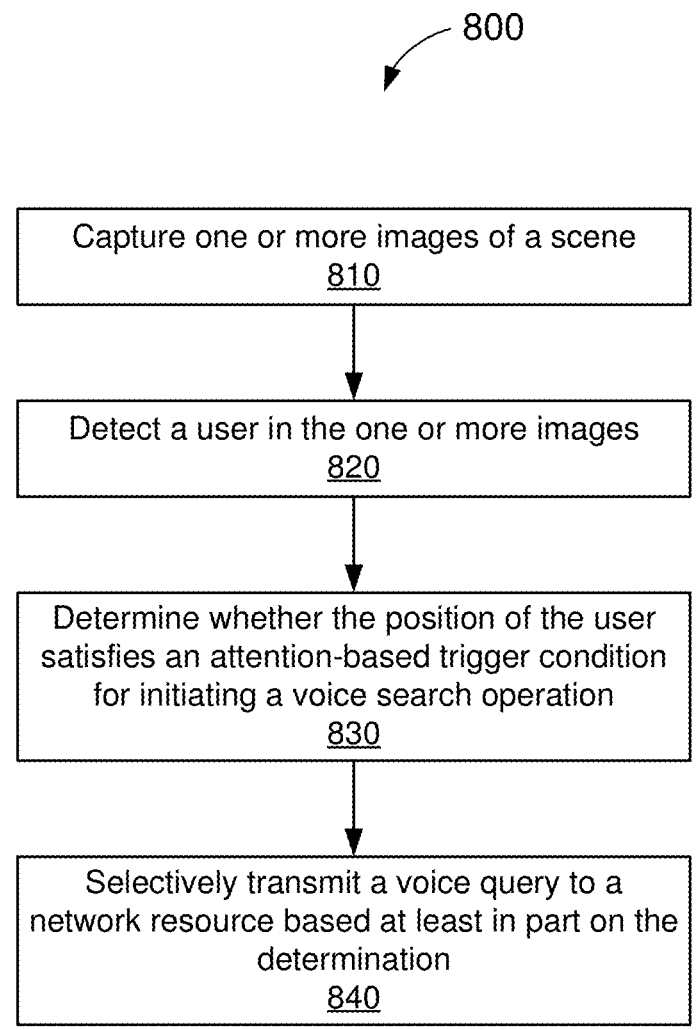
FIG. 8 is an illustrative flowchart depicting an example operation of a voice-enabled device, in accordance with some embodiments.

FIG. 8 is an illustrative flowchart depicting an example operation 800 of a voice-enabled device, in accordance with some embodiments. With reference for example to FIG. 1, the example operation 800 may be performed by the voice-enabled device 110 to provide hands-free operation by listening and responding to vocal instructions and/or queries from a user 101 (e.g., without any physical contact from the user 101).

The voice-enabled device may first capture one or more images of a scene (810). With reference for example to FIG. 3, the one or more images may include still-frame images and/or videos of a scene 301 captured by a camera of the voice-enabled device. For example, the camera may comprise one or more optical sensors (e.g., photodiodes, CMOS image sensor arrays, CCD arrays, and/or any other sensors capable of detecting wavelengths of light in the visible spectrum, the infrared spectrum, and/or the ultraviolet spectrum).

The voice-enabled device may further detect a user in the one or more images (820). For example, the voice-enabled device may detect the presence of one or more users using any known face detection algorithms and/or techniques. In some aspects, the voice-enabled device may detect the presence of the users using one or more neural network models and/or machine learning techniques. In some other aspects, one or more neural network models may be used to detect additional features or characteristics of a user such as, for example, body position (e.g., pose), activity (e.g., gestures), emotion (e.g., smiling, frowning, etc.), and/or identity.

The voice-enable device may determine whether the position of a user detected in the one or more images satisfies an attention-based trigger condition for initiating a voice search operation (830). In some embodiments, the attention-based trigger condition may be satisfied based, at least in part, on a position of the user's body, head, and/or eyes. For example, the voice-enabled device may determine whether a user is paying attention to the device based on the user's body position (e.g., the user's body is facing the device), head orientation (e.g., the user's head is facing the device), gaze (e.g., the user's eyes are focused on the device), gesture (e.g., the user is pointing or otherwise gesturing toward the device), or various other attention indicators.

The voice-enabled device may selectively transmit a voice query to a network resource based at least in part on the determination (840). In some embodiments, the voice-enabled device may transmit the voice query to the network resource only if the attention-based trigger condition is satisfied. In some other embodiments, the voice-enabled device may transmit the voice query to the network resource based on a combination of the attention-based trigger condition and a trigger word. For example, the voice-enabled device may first listen for a trigger word to generate an initial voice query and may generate follow-up voice queries as long as the attention-based trigger condition is satisfied (e.g., without detecting subsequent trigger words). Still further, in some embodiments, the voice-enabled device may suppress attention-based triggers (e.g., originating from a particular location) if a threshold number of false triggers are detected within a relatively short duration.

Figure 9:
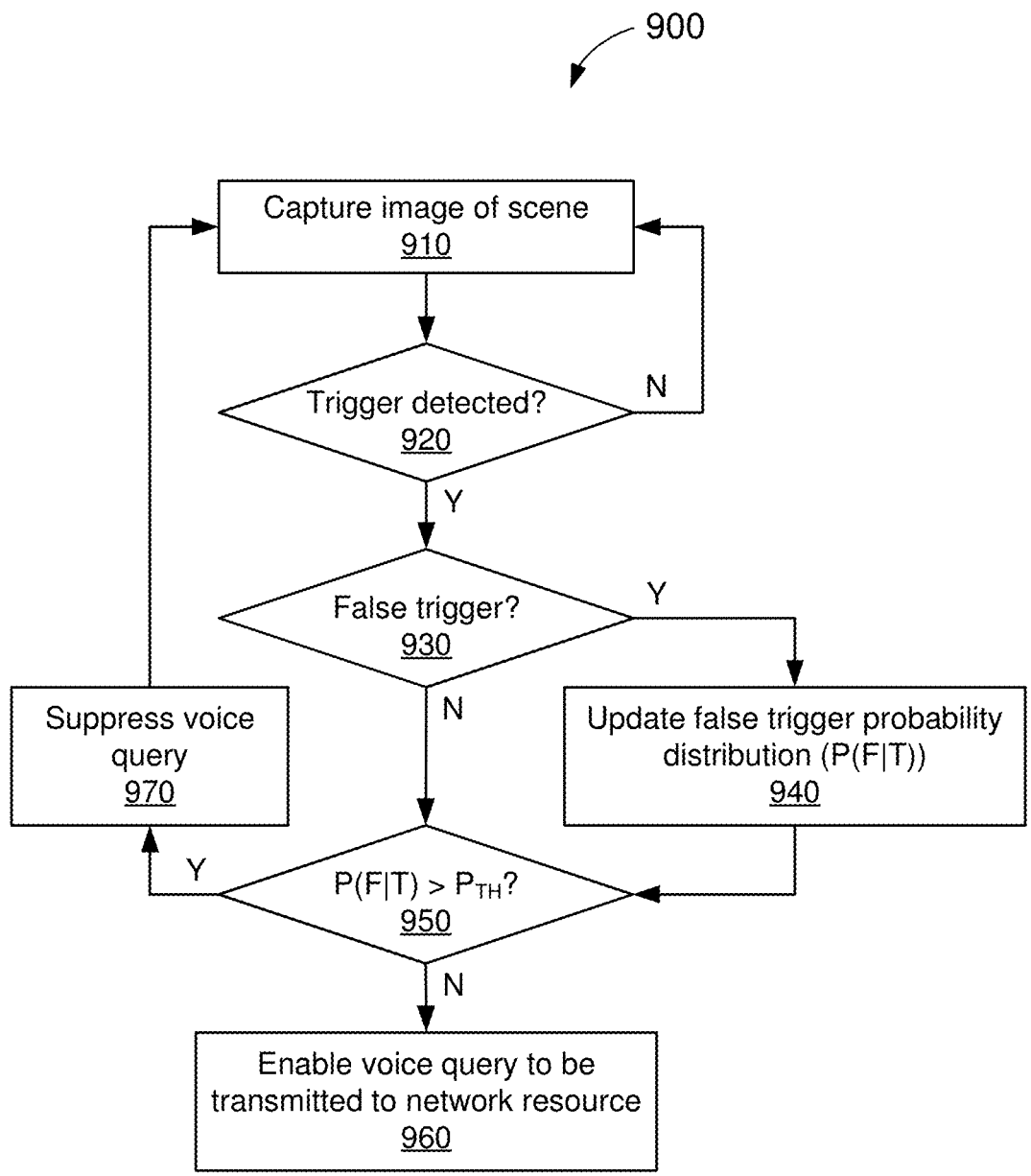
FIG. 9 is an illustrative flowchart depicting an example operation of a voice-enabled device with false trigger detection, in accordance with some embodiments.

FIG. 9 is an illustrative flowchart depicting an example operation 900 of a voice-enabled device with false trigger detection, in accordance with some embodiments. With reference for example to FIG. 5, the example operation 900 may be performed by the false trigger detector 526 of the voice-enabled device 500 to determine whether an attention-based trigger condition is satisfied as a result of a false trigger.

The false trigger detector first captures an image of a scene (910). With reference for example to FIG. 3, the image may include a still-frame image and/or video of a scene 301 captured by a camera of a corresponding voice-enabled device. For example, the camera may comprise one or more optical sensors (e.g., photodiodes, CMOS image sensor arrays, CCD arrays, and/or any other sensors capable of detecting wavelengths of light in the visible spectrum, the infrared spectrum, and/or the ultraviolet spectrum).

The false trigger detector determines whether an attention-based trigger condition is satisfied based on the image of the scene (920). For example, the attention-based trigger condition may be satisfied based, at least in part, on a position of the user's body, head, and/or eyes. In some embodiments, an attention detector 520 may determine the attentiveness of one or more users from the captured images and may selectively assert (or deassert) a trigger signal 502 based on the user's attentiveness. Accordingly, the false trigger detector 526 may determine that an attention-based trigger condition is satisfied when the trigger signal 502 is asserted. If no attention-based triggers are detected in the captured image (as tested at 920), the false trigger detector may continue looking for attention-based triggers in subsequent images captured by the voice-enabled device (910).

If one or more attention-based triggers are detected in the captured image (as tested at 920), the false trigger detector may further determine whether one or more of the attention-based trigger conditions were satisfied as a result of a false trigger (930). As described above with respect to FIG. 6, a false trigger may be detected based, at least in part, on a location of each user, an amount of lip movement detected for each user, a volume of each user's voice, a directionality of each user's voice, an indication of a successful (or unsuccessful voice query), and/or various other false trigger indicators.

If the false trigger detector determines that one or more of the attention-based trigger conditions were satisfied as a result of a false trigger (as tested at 930), the false trigger detector may update a false trigger probability distribution (940). The probability distribution P(F|T) indicates the likelihood of an attention-based trigger condition being satisfied at a particular location as a result of a false trigger. In some aspects, the false trigger detector may update a marginal distribution P(T) of a trigger condition being satisfied at a particular location and a joint distribution P(F,T) of a false trigger being detected at that location (e.g., as described above with respect to FIG. 6). The false trigger detector may then determine a conditional false trigger probability distribution P(F|T) based on the marginal distribution P(T) and the joint distribution P(F,T).

After updating the false trigger probability distribution (at 940) or determining that the attention-based trigger conditions were satisfied not as a result of a false trigger (as tested at 930), the false trigger detector may compare the false trigger probability distribution with a probability threshold (950). As long as the false trigger probability distribution does not exceed the probability threshold (as tested at 950), the false trigger detector may enable a voice query to be transmitted to an external network resource (960). For example, the voice query may include audio recorded from the scene and/or images captured of the scene.

If the probability distribution exceeds the probability threshold at one or more locations (as tested at 950), the false trigger detector may suppress attention-based triggers from the one or more locations (970). More specifically, the false trigger detector may disable or otherwise prevent the voice-enabled device from transmitting a voice query to the network resource in response to attention-based triggers detected at the one or more locations. In some embodiments, the false trigger detector may continue to suppress subsequent attention-based triggers detected at the one or more locations until the probability distribution falls below the probability threshold at the one or more locations (as tested at 960).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of performing voice searches by a voice-enabled device, comprising:
capturing one or more images of a scene;
detecting a user in the one or more images;
determining whether a position of the user satisfies an attention-based trigger condition for initiating a voice search operation; and
selectively performing the voice search operation based at least in part on whether the position of the user satisfies the attention-based trigger condition, wherein the voice search operation includes:
generating a voice query that includes audio recorded from the scene; and
outputting a response based at least in part on one or more results of the voice query.

2. The method of claim 1, wherein the trigger condition is satisfied when the user is facing, looking at, or attending to the voice-enabled device.

3. The method of claim 1, wherein the voice query further includes the one or more images captured of the scene.

4. The method of claim 1, wherein the voice search operation further comprises:
transmitting the voice query to a network resource when the trigger condition is satisfied.

5. The method of claim 4, wherein the transmitting comprises:
recording the audio from the scene upon detecting that the trigger condition is satisfied.

6. The method of claim 1, wherein the determining of whether the position of the user satisfies the attention-based trigger condition comprises:
listening for a trigger word; and
determining whether the position of the user satisfies the attention-based trigger condition after detecting the trigger word.

7. The method of claim 4, further comprising:
determining that the trigger condition is satisfied as a result of a false trigger; and
disabling the voice-enabled device from transmitting the voice query to the network resource based at least in part on the trigger condition being satisfied as the result of a false trigger.

8. The method of claim 7, wherein the disabling includes disabling the voice-enabled device from recording the audio from the scene.

9. The method of claim 7, wherein the false trigger is determined based on at least one of an amount of lip movement by the user captured in the one or more images, a volume level of the audio recorded from the scene, a directionality of the audio recorded from the scene, or a response from a network service indicating that the voice query resulted in an unsuccessful voice search operation.

10. The method of claim 7, wherein the disabling comprises:
determining a first location of the user in the scene based on the one or more images; and
updating a false-trigger probability distribution upon determining that the trigger condition is satisfied, the false-trigger probability distribution indicating a likelihood of a false trigger occurring at the first location, wherein the voice query is not transmitted to the network resource when the likelihood of a false trigger occurring at the first location exceeds a threshold probability.

11. The method of claim 10, wherein the updating comprises:
updating the false-trigger probability distribution to indicate an increase in the likelihood of a false trigger occurring at the first location when the trigger condition is satisfied as a result of a false trigger; and updating the false-trigger probability distribution to indicate a decrease in the likelihood of a false trigger occurring at the first location when the trigger condition is satisfied not as a result of a false trigger.

12. A voice-enabled device, comprising:
processing circuitry; and
memory storing instructions that, when executed by the processing circuitry, causes the voice-enabled device to:
capture one or more image of a scene;
detect a user in the one or more images;
determine whether a position of the user satisfies an attention-based trigger condition for initiating a voice search operation; and
selectively perform the voice search operation based at least in part on whether the position of the user satisfies the attention-based trigger condition, wherein execution of the instructions for performing the voice search operation further causes the voice-enabled device to:
generate a voice query that includes audio recorded from the scene or the one or more images captured of the scene; and
output a response based at least in part on one or more results of the voice query.

13. The voice-enabled device of claim 12, wherein the trigger condition is satisfied when the user is facing, looking at, or attending to the voice-enabled device.

14. The voice-enabled device of claim 12, wherein execution of the instructions for performing the voice search operation further causes the voice-enabled device to:
transmit the voice query to a network resource when the trigger condition is satisfied.

15. The voice-enabled device of claim 14, wherein execution of the instructions for transmitting the voice query to the network resource causes the voice-enabled device to:
record the audio from the scene upon detecting that the trigger condition is satisfied.

16. The voice-enabled device of claim 12, wherein execution of the instructions for determining whether the position of the user satisfies the trigger condition causes the voice-enabled device to:
listen for a trigger word; and
determine whether the position of the user satisfies the attention-based trigger condition after detecting the trigger word.

17. The voice-enabled device of claim 14, wherein execution of the instructions further causes the voice-enabled device to:
determine that the trigger condition is satisfied as a result of a false trigger, wherein the false trigger is determined based on at least one of an amount of lip movement by the user captured in the one or more images, a volume level of the audio recorded from the scene, a directionality of the audio recorded from the scene, or a response from a network service indicating that the voice query resulted in an unsuccessful voice search operation; and
disable the voice-enabled device from transmitting the voice query to the network resource based at least in part on the trigger condition being satisfied as the result of a false trigger.

18. The voice-enabled device of claim 17, wherein execution of the instructions for disabling the voice-enabled device from transmitting the voice query to the network resource causes the voice-enabled device to:
disable the voice-enabled device from recording the audio from the scene.

19. The voice-enabled device of claim 17, wherein execution of the instructions for disabling the voice-enabled device from transmitting the voice query to the network resource causes the voice-enabled device to:
determine a first location of the user in the scene based on the one or more images; and
update a false-trigger probability distribution upon determining that the trigger condition is satisfied, the false-trigger probability distribution indicating a likelihood of a false trigger occurring at the first location, wherein the voice query is not transmitted to the network resource when the likelihood of a false trigger occurring at the first location exceeds a threshold probability.

20. The voice-enabled device of claim 19, wherein execution of the instructions for updating the false-trigger probability distribution causes the voice-enabled device to:
update the false-trigger probability distribution to indicate an increase in the likelihood of a false trigger occurring at the first location when the trigger condition is satisfied as a result of a false trigger; and
update the false-trigger probability distribution to indicate a decrease in the likelihood of a false trigger occurring at the first location when the trigger condition is satisfied not as a result of a false trigger.

* * * * *